Oct. 8, 1935.  C. A. CAMPBELL  2,016,541
FLUID PRESSURE BRAKE
Filed May 11, 1932
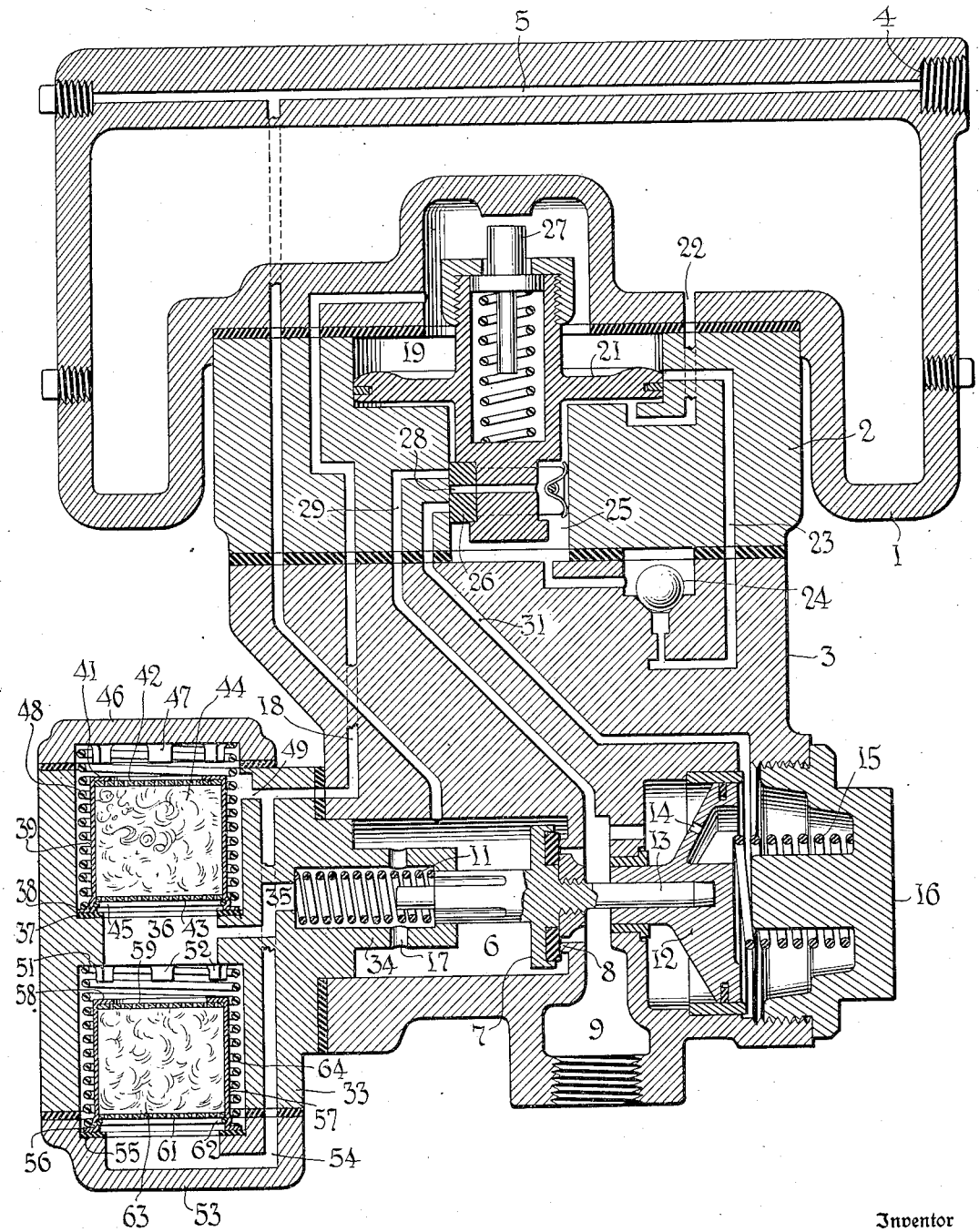
Inventor
Charles A. Campbell
By
Attorneys Patented Oct. 8, 1935

2,016,541

UNITED STATES PATENT OFFICE 2,016,541

FLUID PRESSURE BRAKE

Charles Albert Campbell, Watertown, N. Y., assignor to The New York Air Brake Company, a corporation of New Jersey Application May 11, 1932, Serial No. 610,679

3 Claims. (Cl. 303—88)

This invention relates to fluid pressure brakes, and analogous devices, and resides particularly in a strainer mechanism designed to be interposed between the brake pipe and valve mechanism fed therefrom, such, for example, as triple valves, emergency vent valves, and other devices too numerous to mention.

In order to permit the use of effective filters in such branch connections, it has heretofore been proposed to provide a filter which normally permitted adequate air flow in conjunction with a loaded relief valve which would open to permit adequate air flow if the filter should become clogged to such an extent as to reduce materially the flow through the filter.

Where the flow is reversed, as commonly it is, it was proposed to use two reversely seated relief valves, one of which opened and bypassed the filter when flow was in one direction, and the other of which opened with a like result when the flow was in the opposite direction. These bypass valves are necessarily of substantial diameter and lift, and the springs which hold them to their seats must be given considerable length in order to prevent their resistance from rising too rapidly as the valve is unseated.

In the designs of the prior art as actually used in practice, the volume within the housing taken up by the relief valves was disproportionately large as compared to the volume of the filter which they protected.

The present invention meets the difficulty by mounting the filter in the valve so that the filter is interposed in a by-pass through the valve itself. It follows that the filter avails of space which was wasted in the prior designs, and therefore effects a marked economy even when only one by-pass valve is used.

When the flow is reversible I make use of two reversely seated relief valves, and mount a filter in each of them. The effect is to secure the same valve action as is secured where a single filter is combined with two reversely seated relief valves, and at the same time approximately double the effective volume of the filter. This increase in filter volume greatly extends the period between successive cleanings of the filter. It may be remarked that since the valves are reversely seated only one will open to afford a by-pass around the filter units, and that when it does open it by-passes both the filter units which are, of course, arranged in parallel with each other.

The preferred embodiment of the invention as applied to what is known as a No. 4 vent valve, will now be described in connection with the accompanying drawing, in which the single figure is an axial section through the vent valve equipped according to the invention. No novelty is claimed for the vent valve, and a brief description will suffice.

The housing is made up of a reservoir section 1, a slide valve section 2, and a vent valve section 3. The brake pipe connection is indicated at 4, and leads to a passage 5 which communicates with the vent valve chamber 6. In this chamber is mounted the vent valve proper, 7, whose seat is shown at 8. When the valve 7 is unseated air flows from the chamber 6 through the seat 8 to the exhaust passage 9, and thence to atmosphere. The valve 7 is seated by a compression spring 11, and may be forced in an opening direction by a piston 12 which acts upon stem 13 on valve 7. Piston 12 has a bleed port 14 and is urged in a valve opening direction by a coil spring 15, reacting against the removable plug 16.

The vent valve chamber 6 is connected by the ports 17 with the space around the spring 11, and in the conventional vent valve this space was connected directly with a port 18 which leads to the cylinder space 19 above piston 21. Piston 21 is exposed on its lower side to the pressure within the reservoir housing 1, with which it communicates by way of a port 22.

When the piston 21 is forced to its lowermost position, it overtravels the charging port 23 through which flow occurs past a check valve 24 to the valve chamber 25. This valve chamber communicates with the space below piston 21 so that the charging flow is from the chamber 25 through port 22 already mentioned, to the space within reservoir housing 1. The piston 21 actuates a slide valve 26 of ordinary form.

On a slow reduction of brake pipe pressure, the piston moves upward until arrested by the yielding graduating stop 27, at which time a through port 28 in the valve 26 registers with a port 29 in the valve seat. This permits flow by way of port 22, valve chamber 25 and ports 28 and 29, to the exhaust passage 9. The size of the ports is so chosen that the pressure in the reservoir housing 1 will be reduced at a service rate.

Upon a reduction of brake pipe pressure at an emergency rate, the piston 21 moves upward to its limit of motion, exposing a port 31 in the seat of valve 26. This port leads to the space to the right of the piston 12. Consequently, pressure fluid from the reservoir housing 21 flows to the right of piston 12, forcing this piston to the left and unseating the valve 7. The effect is to vent the brake pipe directly to atmosphere.

The structure so far described is familiar to those skilled in the art, and is here discussed primarily to bring out the fact that there is reversed flow in the port 18.

The improved filter forming the subject matter of the present invention is interposed between the ports 17 and 18, and operates to entrap solid particles regardless of the direction of flow, and to permit flow in either direction should either or both of the filter elements become clogged.

To that end a housing 33 is substituted for the ordinary cover plate at the left side of the housing 3. The housing 33 is formed with a projection 34 which receives and guides the end of a stem on valve 7, and in which the ports 17 already mentioned are formed. In other words, the housing 33 merely takes the place of the cover plate heretofore used and performs the function of that cover plate and some additional functions.

The space around the spring 11 communicates by passage 35 with a chamber 36 at the middle of the housing 33. Above the space 36 is a shoulder which receives a gasket 37. Upon this gasket 37 seats the flange 38 formed at the periphery of a cylindrical shell 39. This shell has at its upper end an inwardly projecting flange 41 which retains a perforate disk 42. Between this and a second perforate disk 43 is confined a mass of curled hair, or equivalent filtering material 44. The disk 43 is held in place by a snap ring 45 which enters a groove provided in the shell 39 to receive it. There is a chamber in the upper end of the housing 33 in which the filter shell 39 is mounted. The upper end of this chamber is closed by a removable cap 46 which is provided with spaced lugs 47 used to limit the lift of the filter shell 39 and also to center a coiled compression spring 48 which reacts between the cap 46 and the flange 38.

The space above the filter unit just described connects through port 49 with the port 18. Below the space 36 there is a shoulder 51 which defines the upper end of a lower filter chamber. It is provided with a series of standoff lugs 52, which are similar in form and function to the lugs 47 already described. The chamber in the lower end of the housing 33 is closed by a cap 53 and a port 54 extending through the cap 53 and the housing 33 joins the port 49 and thus affords communication to the port 18.

The shoulder formed in cap 53 supports a gasket 55 upon which seats a peripheral flange 56 at the lower end of a filter shell 57 identical with the filter shell 39, i. e., it is provided at its upper end with an inwardly extending flange 58 which retains a perforated disk 59. A second perforated disk 61 is retained by a snap ring 62. The disks 59 and 61 confine a body of filtering material such as curled hair 63. A coiled compression spring 64 is centered by the standoff lugs 52 and reacts between the body 33 and the flange 56. The two combined valve and filter units are identical but reversely seated relatively to flow between ports 17 and 18.

When the filters are clean, air will flow from the port 5 to port 17, thence through both filters in parallel, and thence through the ports 49 and 54 to the port 18. This flow serves to charge the reservoir in the housing 1, and to condition the system for operation. Upon a service reduction or an emergency reduction of brake pipe pressure, flow will be toward the brake pipe port 5 and will pass in parallel through both filters. Should either or both of the filters become slogged, one or the other will move from its seat to by-pass both filters, depending on the direction of flow.

It will be observed that there are two distinct filters, so that the flow is through the two in parallel, that the filters are mounted in valves which are reversely seated, that if the flow through the filters is materially restricted one or another of the valves with its filter will shift to by-pass both filters. If the flow is through the brake pipe toward the reservoir the upper filter 39 will move from its seat. If the flow is in the reverse direction, the lower filter 57, will be lifted from its seat. In either case the flow can occur despite the clogged condition of the filter, and the clogging is far less likely to occur because of the larger effective area of the filters. For example, if one of the filters were retained as a fixed unit, it would take the entire space occupied by the other filter to afford room for two relief valves of adequate size and lift and their springs.

It follows, therefore, that by mounting the filters in the valves it is possible to double the capacity of the filter without increasing the overall dimension of the device. In some cases this is not important, but in many cases the dimensional limitations are so severe that this arrangement makes it practicable to apply filters with relief valves to devices which could not otherwise be satisfactorily equipped therewith.

The construction illustrated in the drawing is simple and inexpensive to manufacture. The filter shell can be made of stampings, as can the removable disks. The two disks are duplicates of each other. The snap rings are simple to manufacture. The complete filter units are duplicates of each other as are their springs. To remove them for cleaning it is necessary merely to remove the caps 46 and 53. If for any reason it should be impossible to replace the filter units, the mere replacement of the caps 46 and 53 will restore the device to complete operative condition, but, of course, without the filtering effect. Under emergency conditions this possibility is important.

The possibility of nesting the filter units within the springs not only economizes space, but permits the use of longer springs than would be economically possible otherwise, and the use of long springs is desirable.

While the specific construction described is preferred, modifications within the scope of the claims are contemplated.

What is claimed is:

1. The combination of a fluid pressure device having a chamber, and a passage communicating with said chamber, through which passage pressure fluid flows to and from said chamber; a pair of filter elements mounted in parallel with one another in said passage, both said elements being displaceable by flow in said passage, one in one direction and the other in the opposite direction and either, when displaced offering a by-pass around both; and yielding means resisting such displacement.

2. A combined filter and by-pass valve device for use in filtering flow toward and from fluid pressure devices, comprising two valve seats arranged in parallel with one another and reversely presented relatively to the flow of pressure fluid; two filter sustaining elements, each of substantially cylindrical form and each having a flange adapted to mate with a corresponding one of said seats; filters in said elements; and compression springs encircling said elements and reacting against said flanges to urge them toward said seats.

3. The structure defined in claim 2, in which the cylindrical filter sustaining elements are mounted substantially in axial alinement with each other in communicating chambers in a casing having end caps removable to permit withdrawal of the filter sustaining elements.

CHARLES ALBERT CAMPBELL.